US006702671B2

(12) United States Patent
Tarantino

(10) Patent No.: US 6,702,671 B2
(45) Date of Patent: Mar. 9, 2004

(54) DICE GAME AND GAMING SYSTEM

(75) Inventor: Elia Rocco Tarantino, Las Vegas, NV (US)

(73) Assignee: Colepat, LLC, North Las Vegas, NV (US)

(*) Notice: Subject to any disclaimer, the term of this patent is extended or adjusted under 35 U.S.C. 154(b) by 0 days.

(21) Appl. No.: 10/004,102

(22) Filed: Oct. 23, 2001

(65) Prior Publication Data

US 2002/0169016 A1 Nov. 14, 2002

Related U.S. Application Data

(63) Continuation-in-part of application No. 09/838,949, filed on Apr. 19, 2001, which is a continuation-in-part of application No. 09/684,759, filed on Oct. 6, 2000, which is a continuation-in-part of application No. 09/553,915, filed on Apr. 20, 2000, now Pat. No. 6,605,001, which is a continuation-in-part of application No. 09/439,934, filed on Nov. 12, 1999, which is a continuation-in-part of application No. 09/298,604, filed on Apr. 23, 1999, now abandoned.

(51) Int. Cl.[7] .................................................. G06F 19/00

(52) U.S. Cl. ............................. 463/20; 463/22; 463/19; 463/25; 273/146

(58) Field of Search ............................. 463/20, 22, 19, 463/25; 273/25, 146

(56) References Cited

U.S. PATENT DOCUMENTS

| | | | | |
|---|---|---|---|---|
| 4,718,672 A | | 1/1988 | Okada | |
| 4,834,386 A | * | 5/1989 | Rosenthal et al. | 273/146 |
| 5,413,342 A | | 5/1995 | Kaplan | |
| 5,580,053 A | | 12/1996 | Crouch | |
| 5,609,524 A | | 3/1997 | Inoue | |
| 5,611,535 A | | 3/1997 | Tiberio | |
| 5,695,188 A | | 12/1997 | Ishibashi | |
| 5,807,172 A | | 9/1998 | Piechowiak | |
| 5,823,873 A | * | 10/1998 | Moody | 463/13 |
| 5,976,016 A | * | 11/1999 | Moody et al. | 463/13 |
| 6,173,955 B1 | * | 1/2001 | Perrie et al. | 273/146 |
| 6,213,876 B1 | * | 4/2001 | Moore, Jr. | 463/22 |
| 6,220,959 B1 | | 4/2001 | Holmes, Jr. et al. | |
| 6,241,607 B1 | | 6/2001 | Payne | |
| 6,261,178 B1 | | 7/2001 | Bennett | |
| 6,270,411 B1 | | 8/2001 | Gura et al. | |
| 6,277,025 B1 | * | 8/2001 | Margolin | 463/18 |
| 6,296,569 B1 | * | 10/2001 | Congello, Jr. | 463/17 |

OTHER PUBLICATIONS

Marshall Fey, Slot Machines, A Pictorial History of the First 100 Years, 1983, Liberty Belle Books, 74–75.*

* cited by examiner

*Primary Examiner*—Jessica Harrison
*Assistant Examiner*—Corbett B Coburn
(74) *Attorney, Agent, or Firm*—Weide & Miller, Ltd

(57) ABSTRACT

A variety of methods of playing dice games and apparatus for implementing the games are disclosed. In one embodiment, the game involves the step of accepting a wager, displaying indicia such as images of the sides of dice, determining if identical indicia are connected, and providing a payout for winning combinations of connected dice. In one embodiment, a player places a bet and at least two indicia are displayed. If the indicia are the same, the player has the opportunity to have at least one additional indicia displayed, such as upon placing another bet. Play continues so long as the indicia match. If the player receives at least two matching indicia in sequence, the player may end play and be paid a winning. In another embodiment, a matrix of indicia positions is provided and indicia are displayed in one or more of the positions. Winning combinations of indicia comprise two or more indicia located in adjoining or connecting relationship within the matrix. In one embodiment, a player's bet determines how many indicia are displayed in the matrix. In another embodiment, the player's bet determines the ways a winning combination in determined.

4 Claims, 6 Drawing Sheets

DICE GAME AND GAMING SYSTEM

CROSS REFERENCE TO RELATED APPLICATIONS

This application is a continuation-in-part of U.S. application Ser. No. 09/838,949 filed Apr. 19, 2001, which is a continuation-in-part of U.S. application Ser. No. 09/684,759 filed Oct. 6, 2000, which is a continuation-in-part of U.S. application Ser. No. 09/553,915 filed Apr. 20, 2000, now U.S. Pat. No. 6,605,001 which is a continuation-in-part of U.S. application Ser. No. 09/439,934, filed on Nov. 12, 1999, which is a continuation-in-part of U.S. application Ser. No. 09/298,604 filed on Apr. 23, 1999, now abandoned each of which is incorporated herein by reference.

FIELD OF THE INVENTION

The present invention relates generally to methods of playing games, gaming devices and systems.

BACKGROUND OF THE INVENTION

Traditional slot machine play typically involves wagering on the spin of a mechanical or video-simulated reel. No decision making is involved, other than the decision to play. No skill is involved where the outcome of such gaming is based upon chance.

The interconnection of multiple gaming machines to facilitate a gaming system with progressive jackpots is in use today. Although such wide area links involve progressive jackpots, they do not take full advantage of the potential created by the interconnection of a plurality of gaming machines. Wide area links of gaming machines typically involve traditional computer-controlled slot machines, which, although popular, do not involve a substantial skill element. Furthermore, traditional slot machines facilitate a limited persistence of play. After any given spin, a player is likely to leave the computer-controlled slot machine, because each spin is a completed cycle rather than part of an ongoing game. A game in which each spin or turn is a part of an ongoing game would be advantageous because such a system would encourage a player to continue playing in order to complete a game in progress.

Additionally, traditional slot machine play is a solitary activity. Players compete only against the house, in an introverted process in which they interact not with each other, but only with the gaming machines. With the advent of wide area links of gaming machines, a tremendous potential exists to facilitate multiple player tournaments, in which players would not only compete for the same progressive jackpots, but actually compete against each other in real time. Such multiple player gaming would be more socially interactive, and would facilitate a fun gaming dynamic.

Also, traditional slot machines are not equipped to permit a player to take a break, and to later resume game play. If a player physically leaves an individual slot machine, that player may never revisit the specific game state which the player left behind. Because players like to take short and long term breaks for a variety of reasons, a method to allow a player to save a game state and later restore the saved game would be advantageous. Players would like to be able to take breaks of any length and later resume a saved game at the same or another physical location.

SUMMARY OF THE INVENTION

The present invention provides apparatus and methods for playing various casino games. The games include the use of a plurality of symbols or indicia, such as dice indicia, in games of skill and/or chance.

One embodiment of the invention comprises a game called Link. In one embodiment of this game, at least two indicia are displayed in response to the placing of a wager. A player is permitted to continue to display indicia in sequence, in one embodiment the additional indicia displayed in response to the placing of one or more additional wagers. The player attempts to achieve a predetermined combination of indicia, such as a sequence of the same indicia. If the combination of displayed indicia is not a predetermined combination of winning indicia, then the game is ended.

In another embodiment of the game, a matrix of indicia positions is provided. Preferably, the matrix has m rows by n columns where n or m is at least 2. In one embodiment, the size of a wager placed by a player determines the number of indicia displayed, such as the number of rows or columns of indicia displayed. After the indicia are displayed, it is determined if any of the linked indicia, i.e. indicia which are connected or located in adjacent matrix positions, comprise a predetermined winning combination of indicia. In one embodiment, the predetermined winning combination of indicia comprises a predetermined minimum, such as three, of the same indicia which are linked anywhere in the matrix of displayed indicia. In another embodiment, a predetermined winning combination of indicia results if linked indicia span the entire matrix, such as side-to-side, diagonally, or top-to-bottom.

In one embodiment of the invention, indicia are displayed sequentially and a player attempts to receive matching indicia. In one embodiment, a player places a first wager and two indicia are displayed. If they are matching, the player is permitted to place an additional bet and have one or more additional indicia displayed. If the indicia are matching, a player may be paid winnings or may attempt to continue play to receive additional matching indicia. If the indicia do no match, the game ends.

Further objects, features, and advantages of the present invention over the prior art will become apparent from the detailed description of the drawings which follows, when considered with the attached figures.

DETAILED DESCRIPTION OF THE INVENTION

The invention comprises methods and apparatus for presenting and playing a game. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. One or more embodiments of the invention comprise a game in which one attempts to achieve one or more particular combinations of indicia. Other embodiments of the invention comprise a game in which a player attempts to obtain indicia in a particular sequence or specific indicia linked or connected in one or more arrangements. These and other aspects of the invention will become apparent when considering the detailed description below.

Figure 1:
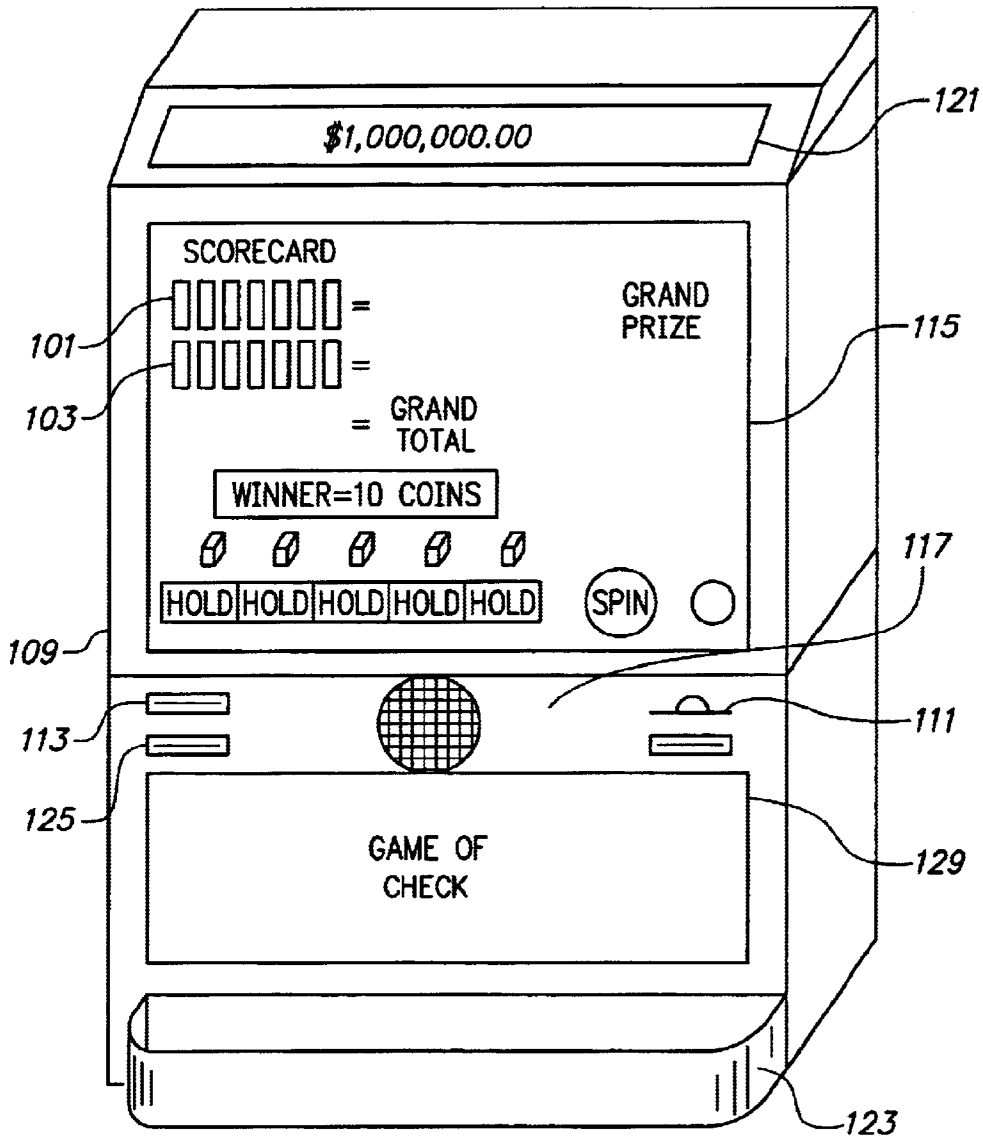
FIG. 1 is a perspective view of a computer-controlled slot machine, in accordance with one embodiment of the gaming system of the present invention.

In a preferred embodiment of the present invention, one or more games are presented for play on a computer-controlled slot machine, for example as shown in FIG. 1. The computer-controlled slot machine 101 includes a microprocessor-controlled computer 103 within a tamper proof and lockable cabinet 109 having a coin acceptor 111 for wagers and a bill validator 113 for wagers, and preferably including a touch-sensitive display 115 for player input and game display. In addition, the computer-controlled slot machine includes a sound speaker 117 for output of digital sound and voice simulations, a tower light 119 (not shown) to indicate jackpots and other game statistics, and a meter 121 to display progressive jackpot information and other text. The computer 103 controls release of coins to a coin hopper 123 for paying players, and controls a ticket printer 125 for generating vouchers. The computer 103 also controls a machine-readable medium reading and writing device 129 for saving and restoring games in progress.

Figure 2:
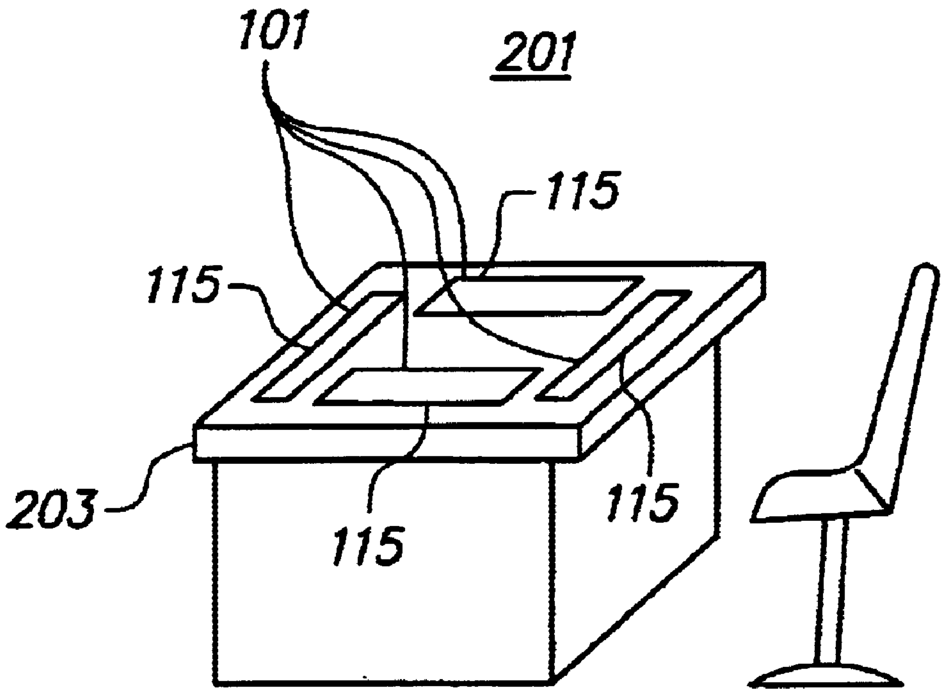
FIG. 2 is a perspective view of four computer-controlled slot machines assembled in a bar table according to another embodiment of the present invention for single or simultaneous multiple user play.

An alternative embodiment of the computer-controlled slot machine is illustrated in FIG. 2. A "bar buddy" version of a computer-controlled slot machine 201 includes all of the features of the computer-controlled slot machine 101. Each "bar buddy" computer-controlled slot machine 201 contains four such computer-controlled slot machines 101, assembled within a bar table 203. Each of the four touch-sensitive displays 115 for player input and game display are mounted in the surface of the bar table 203. The bar buddy computer-controlled slot machine 201 enables from one to four players to play games of the invention simultaneously, either against each other or against the house. The various modes of game play are detailed below.

Figure 3:
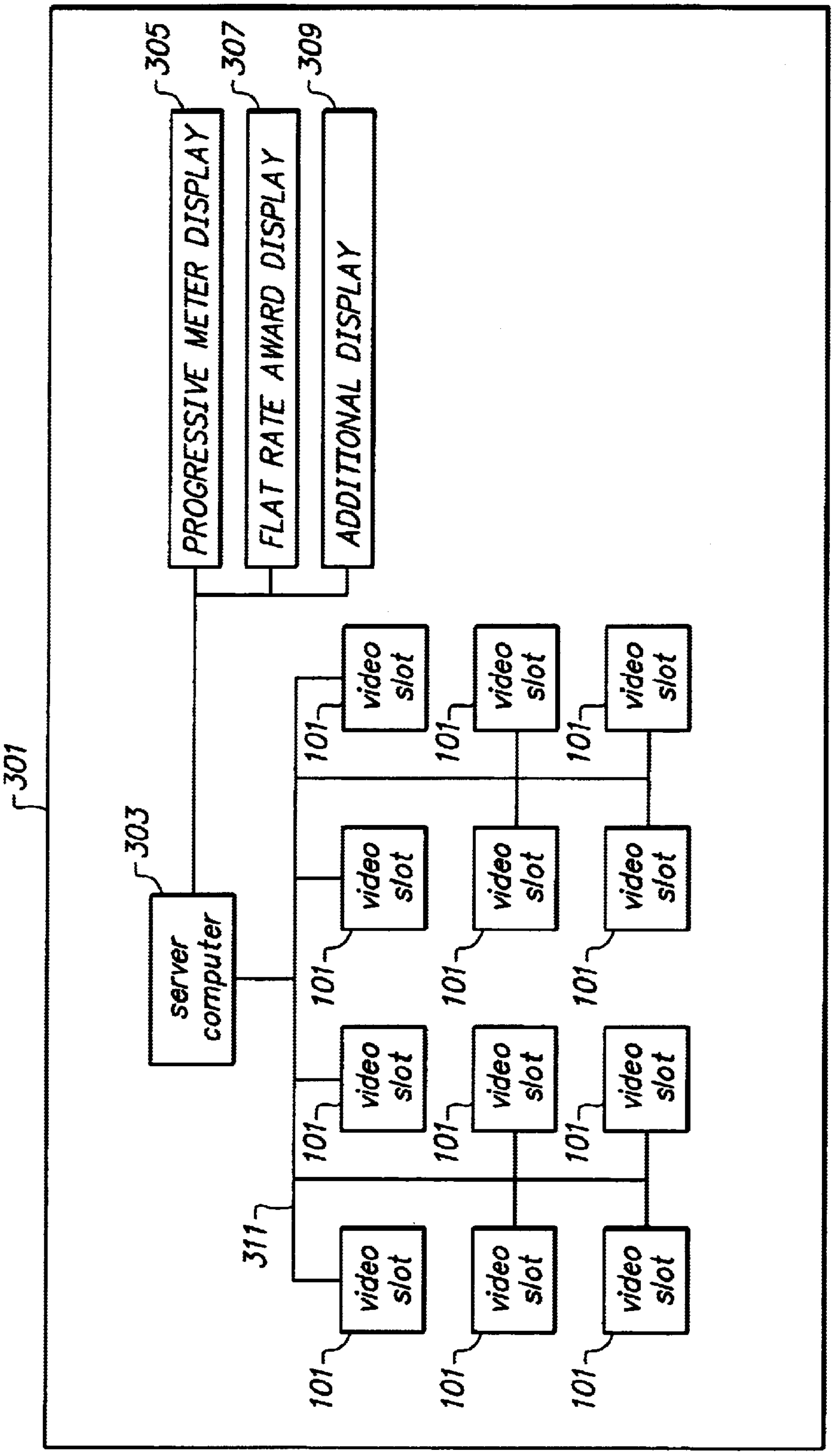
FIG. 3 is a block diagram of a local area network of computer-controlled slot machines, according to the present invention for progressive gaming activity.

Each computer-controlled slot machine 101 is preferably connected to a local area computer network as illustrated in FIG. 3. The local area computer network 301 is controlled by a microprocessor-controlled server computer 303 which controls game play, records game statistics, accounts for vouchers and jackpots, and links the games together. The local area computer network 301 also preferably includes a progressive meter display 305 for showing progressive jackpot information, a flat rate award display 307 for showing flat rate jackpot information, and an additional display 309 for showing the scores that presently qualify for jackpots on the local area network 301. In the preferred embodiment of the present invention, all of the computer-controlled slot machines 101 are connected to the local area computer network 301 in conventional manner via private dedicated lines 311. In an alternative embodiment, some or all of the computer-controlled slot machines 101 positioned at remote locations are connected to the local area computer network 301 via modems and public telephone lines operated in secure mode through encryption/decryption techniques.

Figure 4:
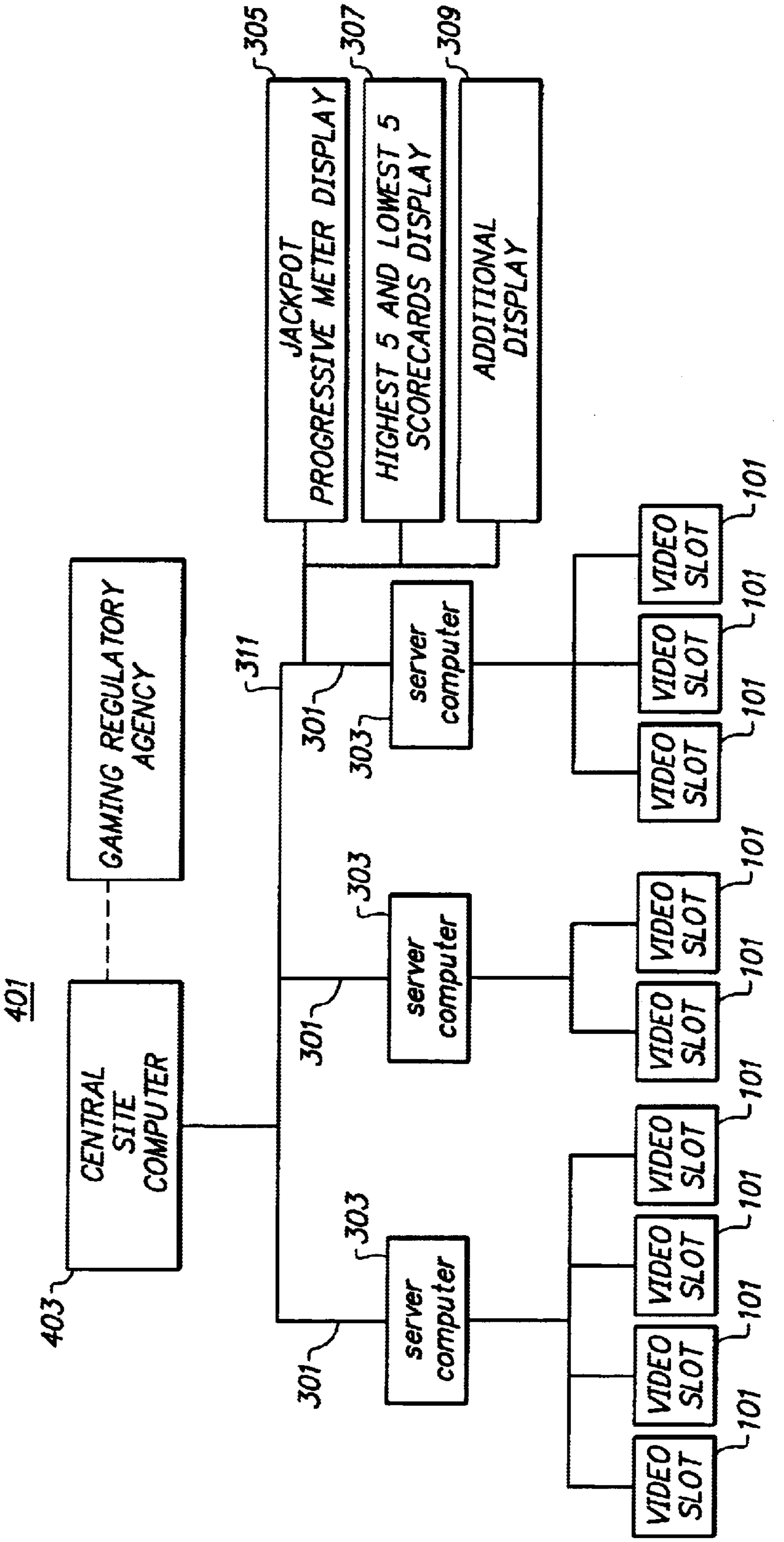
FIG. 4 is a block diagram of a wide area network of computer-controlled slot machines, according to the present invention for progressive gaming activity.

Each local area network 301 of computer-controlled slot machines 101 may be connected to a wide area computer network as illustrated in FIG. 4. The wide area computer network 401 includes local area computer networks 301 at various physical locations. The wide area computer network 401 is controlled by a central-site computer 403 which operates in 24-hour-a-day communication with all local area computer networks 301 on the wide area computer network 401 for security, accounting, and verification of games and jackpots. If a local area computer network 301 is connected to a wide area computer network 401, the progressive meter display 305, the flat rate award display 307, and the additional display 309 of that local area computer network 301 all display jackpot and other information pertaining to the entire wide area network 401. For example, the additional display 309 of a local area computer network 301 which is connected to a wide area computer network 401 shows scores that presently qualify for jackpots on the wide area network 401. In the preferred embodiment of the present invention, each local area computer network 301 is connected to the wide area computer network 401 in conventional secured cryptographic manner via private dedicated lines 311. In an alternative embodiment, some or all of the local area computer networks 301 are connected to the wide area computer network 401 in secured cryptographic manner via modems and public telephone lines.

In one embodiment the games of the invention may be presented on gaming devices which are linked by a satellite communication link. In one arrangement, a first local area computer network is connected to a second local area computer network via a satellite communication link which includes a transmitter/receiver at the location of the first network and a transmitter/receiver at the location of the second network. Data is transmitted from one location to the other via one or more satellites.

This communication network is particularly suited to an arrangement where one local area computer network is located in a first sovereign territory (such as Indian lands) and the second local area computer network is located in a second sovereign territory. In this communication network, the transmission of data can be completed between the first and second sovereign territories without the communication needing to pass through a third or other sovereign territory (iies). This may avoid the necessity of compliance with rules and regulations of the third or additional sovereign territory, simplifying the implementation of the game.

This communication arrangement using satellite links may be applied to games or gaming networks other than that described herein and other than those used to implement the one or more games described herein. For example, in one embodiment, the central site or main computer 403 or other host may be located in one of the sovereign territories, and gaming machines in the other sovereign territory may be linked via the satellite communication link, such as by a transmitter/receiver associated with a server computer 303 in that territory.

In a preferred embodiment of the present invention, the computer-controlled slot machine 101 includes a touch-sensitive display 115 for player input and game display. The touch-sensitive display 115 allows the player to make input selections conveniently, and displays game information in various ways, depending upon game state.

Figure 5:
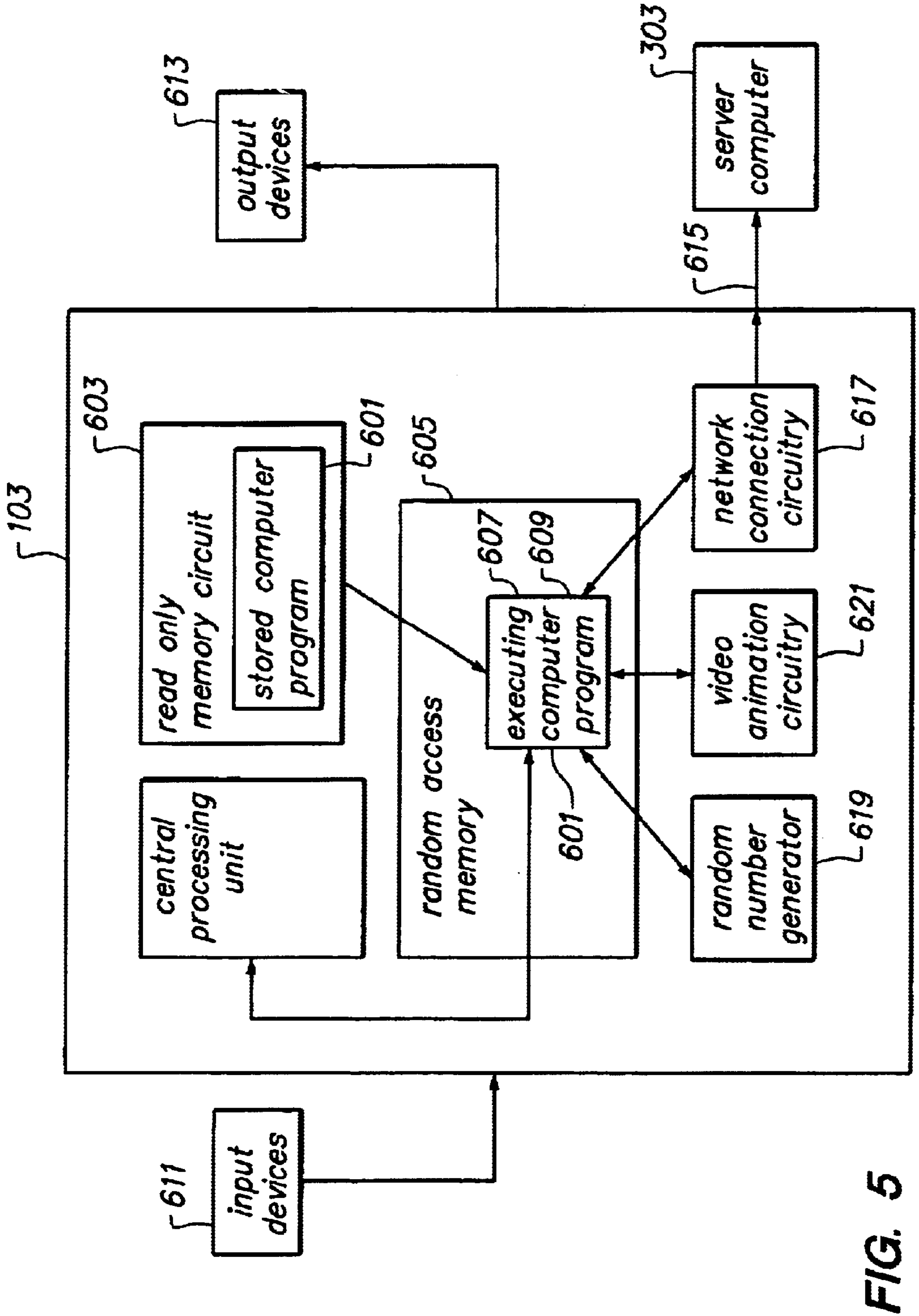
FIG. 5 is a block diagram of the microprocessor-controlled computer and the computer program which facilitate game play according to one embodiment of the present invention.

FIG. 5 illustrates the computer system that facilities game play. In one embodiment of the present invention, game play is facilitated by a computer program 601 executing in the microprocessor-controlled computer 103 within the computer-controlled slot machine 101. In the preferred embodiment of the present invention, the computer program is stored on a read-only memory integrated circuit 603 that is operatively coupled to the microprocessor-controlled computer 103 in the computer-controlled slot machine 101. Of course, in alternative embodiments, the computer program may be stored on various other storage media, such as semiconductor memory or optical or magnetic disk, or the like.

The computer program 601 executes from the random access memory 605 of the microprocessor-controlled computer 103 in the computer-controlled slot machine 101, and includes code 607 and data 609 to facilitate of the game in accordance with the game rules, as detailed below with respect to game play.

The computer program accepts user input from various user input devices 611 of the types previously described, including coin acceptor 111, bill validator 113, the touch-sensitive display 115, and the machine-readable medium reading and writing device 129. Other input devices including mechanical button type switches and lever-arm switch actuators may be used in alternative embodiments as desired.

The computer program also controls computer operation of the various output devices 613 such as the display 115, the sound speaker 117, a tower light 119, the meter 121, the coin hopper 123, the ticket printer 125, and the machine-readable medium reading and writing device 129.

Preferably, the computer program 601 also controls communication with the microprocessor-controlled server computer 303 which controls the local area computer network 301. The computer program 601 controls this communication via a network port 615 and network connectivity circuitry 617 contained within the microprocessor-controlled computer 103.

The computer program 601 utilizes a random number generator 619 to produce random numbers that represent the results of the simulated rolling of the simulated dice 541. The computer program 601 utilizes animation circuitry 621 to produce the simulation of dice on the display 115.

Utilizing a local area computer network 301 and a wide area computer network 401, multiple players may play a game against one another instead of "against the house." The same methodology can be utilized across a wide area computer network 401, allowing players at different physical locations to compete against each other in real time.

In a preferred embodiment of the invention, the process of game play of games played by more than one player is linked or commonly controlled. In one embodiment, a common controller controls the or governs the play of the multiple games. As one example, the common controller may comprise a server 303 such as illustrated in FIG. 3.

In one embodiment, the controller provides control information to two or more computer-controlled gaming machines (such as machines 101 in FIG. 3). The control information may comprise a control signal transmitted over a network (or other communication link) connecting the controller and the gaming machines, such as dedicated lines 311 as illustrated in FIG. 3.

In one or more embodiments, based on the control information, at least one or more events associated with or regarding the play of the games by the one or more players is dictated. In one embodiment, the one or more events comprise a game start, game stop or individual game play steps. In one or more embodiments, the aspect of these one or more events which is dictated comprises the timing of the event. The dictated timing may comprise a precise time or a time window or window by which an event must occur, as detailed below.

In one or more embodiments of the invention, the multiple players play against one another in an attempt to win a prize. The player who receives the highest total score for a particular game may be awarded a jackpot. Other criteria may be utilized for determining one or more winners of the multi-player game, such as lowest score or the highest three scores. In a preferred embodiment, a player is awarded winnings based on the outcome of their game, regardless of whether their result qualified them for winnings when compared to all other players.

In one embodiment other prizes may be awarded based on other criteria. For example, the player(s) who receives the highest score may be awarded a prize, such as money or bonus points towards their total score.

As one aspect of the invention, the order or sequence of the play of the game by a plurality of players is generally synchronized or otherwise controlled. In the embodiment just described, the timing of each step of the game as played by the players is controlled from a time perspective. It will be appreciated that only the play of the game broadly need be controlled from a time perspective. For example, the controller may define a window during which all players are entitled to a play an entire instance of the game.

As indicated, in one or more embodiments, the controller controls the time or time periods for certain activities to occur, such as a player input. One or more embodiments of the invention include a method and system for providing time information to a player. In an embodiment where a player is permitted a time period during which an activity must occur in order for the player to proceed of for the player's act/selection to occur, time period information may be displayed. The time period information may comprise numeric time information, graphical information or other forms of information recognizable by a player. For example, the information may comprise a pie-type graph with remaining time indicated as one portion of the graph illustrated in one color and expired time indicated as a portion of the graph in another color.

In one or more embodiments, audible or visible alarms or alerts may be provided to a player. For example, an area of the display may flash and indicate to a player that the player only has a short period of time remaining (such as 1 minute, 15 seconds or the like) to take action.

In one or more embodiments, when the player takes action, the time indicator may be removed or other information displayed to the player indicating that the player's action/selection has been accepted. In one or more embodiments, certain actions by a player may be rescinded and a new action/selection permitted.

In one or more embodiments, a method of game play is disclosed in which one or more aspects of game play must occur within a particular time period or before a certain time. If one or more of the acts or inputs are not provided within the required time, the player may be prevented from continuing further and completing the game.

Selections by a player, game state information and similar information is preferably forwarded from each gaming device or machine to the controller. In the event a player does not take the necessary action within the required time, then the controller may be adapted to send a signal to the gaming machine to cause the gaming machine to not accept input from the player for proceeding in game play. This same signal may cause the display of information to the player that the player did not act in sufficient time and that the player is not permitted to continue playing.

In one or more embodiments, a player's bet may be refunded if the player does not take action within the required time. For example, if a player places a bet but does not then spin the reels within the required time, the player's bet may be credited back or refunded. Preferably, the player's bet is not refunded if the player fails to provide input after one or more of the steps which define the outcome of the game occurs. For example, a player may not be entitled to a refund of their bet if after a spin of the dice the player does not hold one or more dice, as such may allow the player to take advantage of the casino/house by ceasing to act except where a favorable combination of dice are received on the first spin.

In one or more embodiments of the invention, the multiple gaming machines which are used to present the games to the multiple players may be located adjacent to one another or located remote from one another. For example, a plurality of gaming machines associated with a controller may be located in a particular room or rooms of a casino. On the other hand, the gaming machines may be associated with a local or wide area network allowing the gaming machines to be located remote from one another and/or the controller. For example, one or more of the gaming machines may be located in a first casino and other of the gaming machines located in an entirely different casino.

In one or more embodiments, the controller need not be entirely computer controlled. As one aspect of the invention, a human "caller" may be involved in the control of the multi-player game. The caller may provide information to players, such as instructions to take particular actions. The caller may also provide time information and generate or cause the generation of a control signal event. For example, the caller may cause the initiation of a time period via a computer or other device associated with the controller or providing input directly to the controller. The caller may provide an input to the controller causing the controller to start a period of time running or set a time by which an event is to occur. In this arrangement, the caller may provide gaps of time between events.

As one aspect of the invention, the caller may be provided with information regarding player activities, such as the total number of players and the number of players having made and/or not made a selection or engaged in the require activity. This information may be used by the caller to prompt players to take action or permit an extension of the time period for taking action.

A caller may be utilized even when the gaming machines are located remotely from one another. In one embodiment, the image of the caller may be transmitted to each player, such as by a separate communication channel and one or more displays which are visible to players of the gaming machines, or even by picture-in-picture display of the information to the player directly at the gaming machine. In one or more other embodiments, a caller may be utilized even though the caller is not present or visible to the player. For example, a caller may be used to controller the game play, such as starting and stopping time periods, which time periods are only indicated to a player.

The arrangement of the system including the one or more devices for implementing a method of multi-player game play in accordance with the invention may vary. As indicated, in one embodiment, a plurality of gaming machines or devices are associated with at least one controller via one or more communication pathways. In one embodiment, each gaming device may be provided with its own gaming controller, such as including a random number generator for generating game outcomes. The main controller may provide control information to each gaming machine, and each gaming machine may be arranged to generate (within the control of the main controller) the game information specific to that gaming machine, such as the outcome of a particular spin.

In another embodiment, all or substantially all of the game play information may be generated remotely from the gaming machine. For example, the controller including a random number generator for generating a plurality of game outcomes for the differing gaming machines. This game play information may then be transmitted to each particular gaming machine.

In one or more embodiments of the invention, information regarding each player's own game play, including prior game play, and others' game play may be presented. In one embodiment, information regarding a player's previous game play may be displayed.

In one or more embodiments, the multiple players may play against the house, such as a computer generated game result.

As used herein, the term "computer-controlled slot machine" denotes a computer controlled machine which facilitates wagering, which generally requires the input of money in order to be operated, and which outputs money in response to the achievement of winning wagering results. It will be appreciated that one or more aspects of the machine, including the interface or what is referred to herein as the touch sensitive display may be electrical, mechanical and/or electro-mechanical in nature. For example, while the buttons may comprise touch-sensitive areas of a display, they may comprise electro-mechanical buttons which are activated by mechanical movement (such as depression) by a player. In addition, simulated dice (as used in one embodiment of a game of Link described below) may, instead of comprising solely computer generated images, actually comprise dice of dice faces mounted on a rotating reel and arranged to stop in controlled position. The simulated dice of other symbols may be provided in a variety of other manners, such as by laser light generation. The dice or other symbols are referred to in certain instances as "simulated," but could actually comprise faces of actual physical dice. The displays and display areas may comprise CRT type displays, LCD or LED displays or any other means for displaying information now known or later developed.

Of course, the present invention is not limited to the generation and display of images in the form of the video simulated dice. In other embodiments, other images are generated and displayed in the course of game play. For example, in one embodiment, the images generated and displayed are in the form of different colors. In another embodiment, graphical representations of different types of fruit are generated and displayed. In yet another embodiment, roman numerals are utilized. The generation and subsequent display of any image in a set of at least two display areas in the course of game play is within the scope of the present invention.

In one or more embodiments of the invention, such as illustrated in FIG. 5, a gaming machine in accordance with the invention may include a random number generator. The random number generator is adapted to produce random numbers which represent the outcome of the rolls of the dice or other symbols.

In another embodiment of the invention, permutations of roll outcomes are stored in a memory. One of the permutations is selected in order to determine the outcome of a roll. In one embodiment, the selection is random. In one embodiment, particular permutations may be removed depending on the status of the game.

In one embodiment, the indicia which are used to play the game may be located on wheels, reels, or other elements.

For example, the sides of a dice may be represented on a single flat disc. The wheels or reels may be rotated or moved to produce the random outcome.

In an embodiment where physical elements, such as physical dice or balls with dice indicia, are used to generate random indicia used in the game, the number of physical elements may vary.

A game in accordance with the invention will be described with reference to FIG. 6. This game is referred to herein as "Link." The game is preferably presented on an electric gaming device such as that described above, which device includes a video display 1920. In other embodiments, the game may be presented as a reel or other type game. In general, in this game a player attempts to obtain a predetermined combination of indicia, either in sequence or in linked or connected relationship.

In accordance with the game, a player places a wager or bet in order to establish entitlement to play the game. As described below, the size of the bet may determine how the game is presented or how a winning result is determined.

Figure 6:
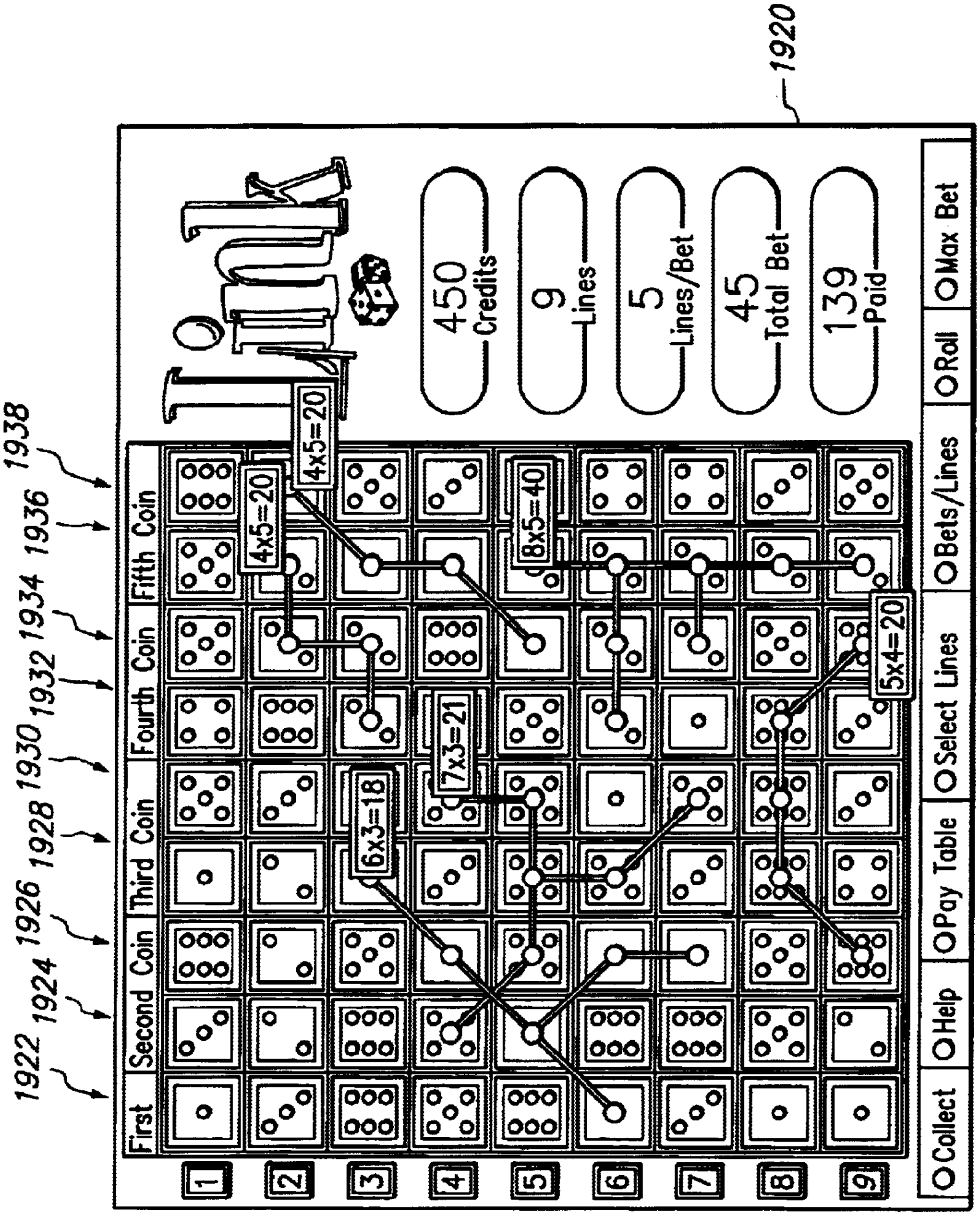
FIG. 6 illustrates a display containing graphical information presented during the play of a game of the invention.

In one embodiment, at least one row, or as illustrated in FIG. 6, at least a first column 1922 of dice indicia are displayed. The number of indicia which are displayed may vary. As detailed below, the number of indicia displayed may be dependent upon the size of the player's bet. The number of indicia are preferably at least two, and more preferably three or more. The dice indicia are preferably randomly selected, such as by generation with a random number generator where each number is associated with a particular dice side.

In one embodiment, then the player is a winner only if the player receives a predetermined combination of dice indicia in the first set or column 1922 of displayed indicia. In a preferred embodiment, winning combinations of dice indicia comprise two or more of the same dice indicia in adjacent displayed positions. In one embodiment, a player is awarded a winning, such as a payout, based upon the amount bet.

In accordance with one embodiment of the invention, additional rows or columns of dice indicia are displayed. In one embodiment, a first column 1922 of dice indicia is displayed based on a bet of a first amount, and an additional column or columns are displayed based upon larger amounts bet. In one embodiment, two additional columns 1924, 1926 of dice indicia, for a total of three columns, are displayed based upon a second bet. Likewise, two additional columns 1928, 1930 of dice indicia, for a total of five columns, are displayed based upon a third bet. Lastly, two additional columns 1932, 1934 of dice indicia, for a total or seven columns for a fourth bet, and two additional columns 1936, 1938, for a total of nine columns, for a fifth bet.

In this arrangement, a maximum bet results in a total of 9 (nine) columns of dice indicia being displayed. When the number of dice indicia per column is 9 as illustrate, then the result is a matrix which is 9 by 9, for a total of 81 dice indicia. Of course, the matrix may have a variety of sizes, such as n×m where d and/or m are as few as 1 or greater than 9. Further, a greater or lesser number of dice indicia may be displayed in the possible indicia positions of the matrix.

Preferably, a matrix of indicia where n and m are both 2 or greater is displayed in response to a single bet. In an embodiment where either n or m is 1, the game preferably proceeds in accordance with the embodiment described below wherein indicia are displayed sequentially, rather than in a matrix form.

In one emboidment, the dice indicia may be displayed in rows instead of columns. For example, upon plcing a first bet, a first row of dice indicia may be displayed. Upon placing a layer bet, an additional row or rows of dice indicia may be displayed.

In one embodiment, a player is declared a winner as to one or more predetermined combinations of dice indicia which are achievable with the dice indicia which are displayed. In one embodiment, the combination of dice indicia may be generated not only from indicia located in the same row or column, but in joined or linked rows or columns. In one embodiment, winning combinations of dice indicia may be achieved from associated dice indicia. By "associated" it is meant located in an adjacent position (i.e. to the top, bottom, side, or corner) to an indicia.

In one embodiment, a winning result may be declared if a plurality of the same dice indicia appear in a horizontal row. In one embodiment, a winning result may be declared if a plurality of the same dice indicia appear in a vertical column. In one embodiment, a winning result may be declared if a plurality of the same dice indicia appear in a diagonal line. In one embodiment, a winning result may be declared if a plurality of the same dice indicia are associated or connected in many pattern. In one embodiment, a winning result may be declared if a plurality of the same dice indicia are associated or connected in a predetermined pattern. In one embodiment, a winning result may be declared if the plurality of dice appear in one or more of the above-described manners, such as horizontally, vertically or diagonally.

FIG. 6 illustrates an example in which a combination of dice indicia is declared a winning combination if the dice indicia are the same and are linked or associated in any manner.

In one embodiment, a player may be declared a winner for receiving a predetermined number of linked or associated identical indicia, such as 2 or 3 linked indicia. In other embodiments, the result may not be a winning result unless 4 or more of the same indicia are linked.

Winnings may be paid for winning combinations. The winnings paid may comprise the number of linked indicia multiplied by the largest bet (such as coin) for any column in which one of the dice indicia lies. For example, in the embodiment illustrated, five dice indicia bearing the number 5 (five) are linked in rows eight and nine. The last of these dice indicia is located in column 1934 which was displayed as a result of the fourth bet or coin. As such, the total winning is 5 (indicia) multiplied by 4 (highest bet), or 20 coins. In another embodiment, a payout table may be provided which dictates fixed amounts for combinations of indicia.

In another embodiment, a predetermined amount may be paid for combinations of indicia, such as a certain amount for 2 linked indicia, 3 linked indicia or the like. Preferably, the winnings increase as the total number of linked indicia increases. Jackpot winnings may be awarded for receiving a high number of associated indicia, such as 9 or more. The jackpot may be funded from a portion of each player's bet which is set aside in a jackpot fund.

The winnings paid may also depend on the arrangement of the linked indicia. For example, if the linked indicia are all in the same row or column, than a larger winning may be awarded than if the linked indicia are in another arrangement. A particular winning may be awarded if the linked indicia are along a diagonal line.

In another embodiment, a player is declared a winner for receiving a particular pattern of related dice indicia. One such pattern is a string of the same dice indicia which extends in uninterrupted fashion from the first column to the last column of the matrix. In this embodiment, if a sequence of the same indicia are linked from the first column 1922 to the last column 1938, then the result may be declared a winning outcome. In one embodiment, the linked indicia may be located in any row. In another embodiment, a winning outcome may be declared if the indicia are all located in the same row and extend from the first to the last column. In one embodiment, this winning outcome is only declared if the player has placed the maximum bet and the indicia link across all columns. In another embodiment, a winning outcome may be declared if the same indicia are linked across multiple columns, even if the maximum bet is not placed. Of course, the amount awarded preferably increases as the likelihood of obtaining the outcome decreases.

Another pattern may be that where a string of the same dice indicia extends in linked fashion from the top to the bottom of the matrix. Another pattern may be where the same dice indicia extend along the diagonal of the matrix or are otherwise linked from corner to corner.

A player may also be paid winnings if a particular indicia appears anywhere more than a predetermined number of times. For example, in the case of the 9×9 matrix illustrated in FIG. 6, a player may be paid a winning if any particular indicia appears more than 15 times. The greater the number of occurrences of the indicia above the minimum, the larger the amount which may be awarded.

In one embodiment, the game may include the step of providing a visual indication of the winning combinations of indicia. For example, linked or connected indicia may be highlighted, as illustrated in FIG. 6. In one embodiment, highlighting of a first color is used to identify a first set of linked indicia, and highlighting of a second color to identify a second set, and so on.

As illustrated in FIG. 6, information other than the displayed indicia may be provided to the player. For example, information regarding the number of credits or other monies or awards belonging to the player may be displayed. Information may also be provided regarding the number of lines and rows of indicia displayed or wagered.

A variety of betting options may be presented which affect the way the game is played or the way winnings results are determined. As indicated, in one embodiment, a player may be required to place incrementally larger bets in order to have additional columns or rows of playable indicia displayed. For example, a single column or row may be displayed upon placing a bet of a first amount, and one or more additional columns or rows may be displayed if the player places a bet of a second amount larger then the first amount. The amounts may be incrementally larger than one another, such as by denomination (i.e. $.25, $.50, .$75 or $1.00, $2.00, $3.00, etc.).

In another embodiment, all indicia are displayed if a player places a required minimum bet, and winning combinations are determined and winnings paid. However, if the player places a second, larger bet, then the winnings paid for winning combinations are, for one or more winning combinations, larger than the amounts paid if the player places only the minimum bet.

As one variation of the game, the "ways" by which the combinations of dice indicia are determined to be winning combinations may depend upon the size of the bet. For example, if a player places only a first bet, the entire matrix of indicia are displayed, but only vertical (i.e. in column) combinations of dice may be eligible to be declared winning. If a player places a bet of a second, larger amount, then all vertical and horizontal (i.e. in row) combinations may be eligible. Upon placing larger bets, diagonal and any associated indicia combinations may be added.

In accordance with another embodiment of the game of Link, a player may attempt to obtain a particular sequence of indicia. In one embodiment, this game may comprise the above-described game wherein the indicia are displayed in a single row or column (i.e. n or m equals 1).

In one embodiment of the invention, the game involves the sequential display of dice indicia. In this embodiment, a player places a first bet and preferably, two dice indicia are displayed. If the dice indicia are the same, then the player is a winner of a first award. The player may elect to end the game and receive the first award. Alternatively, the player is entitled to place an additional bet, upon which a third or next dice indicia is displayed. If the next dice indicia is the same as the first two, then the player is the winner of a second award. This award will generally be larger than the first award as a result of the lower odds or receiving the indicia combination. If the third indicia is not the same as the first two, then the outcome of the game is a losing outcome.

In one embodiment, a player may be permitted to continue placing additional bets and display indicia until a predetermined maximum number of dice indicia are displayed. If the player reaches that predetermined maximum and all of the dice indicia are the same, then the player may receive a particularly large winning, such as a jackpot winning.

In this embodiment, the dice indicia are preferably displayed sequentially in a single row, column or other line. In one embodiment, dice indicia locations may be displayed, and the number of locations displayed may be dependent on the size of the player's bet. Once the bet is placed and the locations displayed, the player may touch the first location to initiate a simulated dice roll. Thereafter, the player may sequentially touch each additional dice location to effectuate the simulated spin.

As a variation to this embodiment of the invention, a player places a bet to start the game. At least a two (i.e. a first and second) indicia are displayed. If they are the different, the game ends. If they are the same, then the player is placed an additional bet or wager to have at least one additional indicia displayed. The game continues as described above, with the game ending if the combination of displayed indicia do not match or otherwise comprise a predetermined combination of indicia, and permissibly continuing if the player elects.

In another variations or embodiments of the game of Link, a matrix of indicia positions, such as black circles or boxes, is displayed. A player is permitted to select one or more indicia to be displayed based upon one or more wages. For example, a player may be permitted to have a single indicia displayed for each bet placed. The player attempts to select positions which result in the display of indicia resulting in a predetermined combination of winning indicia.

As an example of this embodiment invention, a matrix of 9 by 9 possible indicia locations may be displayed. A player places a first bet and is entitled to select one of the locations. The indicia at that location is displayed. The player is entitled to place a second bet and then select a second location and have the indicia displayed at that location, and so on. If the player receives a predetermined combination of indicia as a result of the player's selections, then the player may be declared a winner of the event. In this embodiment, a player may be declared a winner of a first winning amount after a certain combination of indicia have been displayed. The player may, however, continue to place additional bets and make additional selections in an attempt to receive a winning outcome which results in a higher reward. For example, a player may receive the same indicia for three selections along a row of the matrix and be entitled to a reward of a first amount. The player may place an additional bet and select the next space. If the same indicia is displayed, resulting in four of the same indicia being displayed in sequence, the player may be entitled to larger award. In another embodiment, upon placing a bet of a first amount, a player may be permitted to make a certain number of selections. If the player places a larger bet of a second amount, the player may be permitted to make a larger number of selections.

The indicia may be displayed in a variety of manners. In an embodiment where the indicia comprise the images of the sides of dice, simulated dice may spin or roll and stop in one position. In another embodiment, a plurality of mechanical reels may be provided, the one or more reels displaying all or some of the indicia. The player may spin the first reel or reels, and spin additional reels based on the size of the bet.

In another arrangement, a player may use a "scratch" card having a number of indicia hidden under a removable covering. The player may attempt to scratch off or remove the covering from one or more of the indicia in an attempt to receive a particular combination of indicia.

In one embodiment, a row, column, matrix or other arrangement of indicia positions may be provided. A player may "throw" (in simulated video fashion, or in a mechanical fashion as described above) a set of dice. The result of the throw may be posted to the row or column of the matrix. The player may then "throw" the dice additional times to post dice indicia to the additional rows or columns as described above, such as upon waters or bets placed.

In one or more embodiments of the invention, the games described above may be played with dice or simulated dice having more than 6 sides. For example, dice having 9 sides may be used, or dice having 12 sides may be used. Such dice may be provided with dots representing the values 1–9, the actual numerical values 1–9, or even include traditional dice indicia as well as other indicia, such as wild card symbols or letters.

The use of one or more of such dice has the advantage that a number of additional combinations of dice indicia are provided, and the odds of receiving certain combinations or outcomes change. For example, in the event the 9 sided dice are utilized, the probability of obtaining a sequence of six matching indicia in six successive rolls or spins is much less than if 6 sided dice are utilized (in this case, approximately 10 times less likely).

It will be appreciated that the indicia which are displayed for use in playing the game need not be arranged in a matrix as illustrated in FIG. 6. For example, the number of indicia or indicia positions per row and per column need not be the same for every row and every column. For example, the indicia positions may be arranged in a pyramid format with a greater number of indicia in one row at the bottom than at a row at the top. The indicia positions may also be arranged in a square or other design.

The game of Link may be played with indicia other than dice indicia. For example, the indicia utilized may comprise pictures of different animals or of different fruit. The number of indicia in the set of indicia utilized may vary, thus varying the odds of receiving a particular indicia. For example, in the case of a six-sided dice, there are six different possible indicia. A set of animal indicia may be utilized, however, including pictures of 10 different animals. In the latter case, the odds of receiving any particular indicia are reduced. In one embodiment, the "set" of indicia utilized need not include the same number of each indicia. For example, there may be only two "lion" indicia, but ten "jaguar" indicia. Winning paid may be greater for linking the less common indicia.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method of playing a game in which a player attempts to receive a combination of sequentially arranged indicia comprising the steps of:

accepting a first wager;

displaying at least a first indicia and a second indicia selected from a group of indicia in response to the first wager;

ending the game is said first and second indicia are not the same;

if said first and second indicia are the same, permitting a player to continue game play by accepting at least a second wager;

displaying at least a third indicia selected from said group of indicia in response to the second wager; and determining if the combination of the first, second and at least one third indicia comprises a predetermined combination of indicia and ending the game if the combination is not a predetermined combination and declaring the outcome of said game a winning outcome if said combination comprises a predetermined combination.

2. The method in accordance with claim 1 including the steps of accepting a third wager if said combination of first, second and at least one third indicia comprises a predetermined combination of indicia, displaying at least one fourth indicia selected from said group of indicia and determining if the combination of said first, second, at least one third and fourth indicia comprises a predetermined combination of indicia and ending the game if the combination is not a predetermined combination of indicia and declaring the outcome of said game a winning outcome if said combination comprises a predetermined combination.

3. The method in accordance with claim 1 where said predetermined combination comprises the first, second and at least one third indicia comprising the same indicia.

4. The method in accordance with claim 1 wherein said indicia comprise images of the sides of dice.

* * * * *